US008522233B2

(12) United States Patent
Nakamura et al.

(10) Patent No.: US 8,522,233 B2
(45) Date of Patent: Aug. 27, 2013

(54) FIRMWARE UPDATING SYSTEM, FIRMWARE DELIVERING SERVER, FIRMWARE EMBEDDED DEVICE, AND PROGRAM

(75) Inventors: Yuichi Nakamura, Tokyo (JP); Nobuyuki Ohama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 238 days.

(21) Appl. No.: 13/120,175

(22) PCT Filed: Mar. 8, 2010

(86) PCT No.: PCT/JP2010/053773
§ 371 (c)(1), (2), (4) Date: Mar. 22, 2011

(87) PCT Pub. No.: WO2010/116835
PCT Pub. Date: Oct. 14, 2010

(65) Prior Publication Data

US 2011/0173604 A1 Jul. 14, 2011

(30) Foreign Application Priority Data

Mar. 30, 2009 (JP) ................................ 2009-083315

(51) Int. Cl.
*G06F 9/44* (2006.01)

(52) U.S. Cl.
USPC ............................ 717/173; 717/168; 717/170

(58) Field of Classification Search
None
See application file for complete search history.

(56) References Cited

U.S. PATENT DOCUMENTS 6,266,809 B1 * 7/2001 Craig et al. ................... 717/173
6,721,612 B2 * 4/2004 Aramaki et al. ................ 700/87
6,907,602 B2 * 6/2005 Tsai et al. ..................... 717/168
7,313,791 B1 * 12/2007 Chen et al. .................... 717/170
7,318,151 B1 * 1/2008 Harris .............................. 713/2
7,640,367 B2 * 12/2009 Takamoto et al. ................ 710/6
7,661,102 B2 * 2/2010 Ogle ............................ 717/168
7,861,119 B1 * 12/2010 Righi et al. ................. 714/38.1
8,261,256 B1 * 9/2012 Adler et al. ................... 717/173
2007/0169064 A1 * 7/2007 Hagihara et al. ............. 717/162

(Continued)

FOREIGN PATENT DOCUMENTS

JP 11-110218 A 4/1999
JP 2004-355304 A 12/2004

(Continued)

OTHER PUBLICATIONS

PTO 13-1142, Dec. 2012, Translation, Mastato et al.*
Felser et al., "Dynamic Software Update of Resource-Constrained Distributed Embedded Systems", 2007, IFIP International Federation for Information Processing, vol. 231, Embedded System Design: Topics, Techniques and Trends, eds. A. Rettberg, Zanella, M., Dömer, R., Gerstlauer, A., Rammig, F., (Boston: Springer), pp. 387-400.*

(Continued)

*Primary Examiner* — Thuy Dao
*Assistant Examiner* — Stephen Berman
(74) *Attorney, Agent, or Firm* — Mattingly & Malur, PC

(57) ABSTRACT

The present invention provides a firmware update technique in which a work area is small, a work time is short, update can be resumed even if power-down occurs, and even a file system which does not support writing is supported. To provide the firmware updating technique, an update creating and distributing server divides old and new version firmware images, extracts a difference between the new and old divided firmware images, creates an updated package, and delivers the updated package to an embedded device. On the other hand, the embedded device applies the updated package to the old version divided firmware image (an existing firmware message currently in use).

6 Claims, 12 Drawing Sheets

(56) References Cited

U.S. PATENT DOCUMENTS

| | | | | |
|---|---|---|---|---|
| 2008/0092132 | A1 * | 4/2008 | Stuber et al. | 717/173 |
| 2008/0098160 | A1 | 4/2008 | Slyz et al. | |
| 2008/0168434 | A1 * | 7/2008 | Gee et al. | 717/173 |
| 2009/0083475 | A1 * | 3/2009 | Hsiao et al. | 711/103 |
| 2011/0093839 | A1 * | 4/2011 | Murase | 717/168 |
| 2011/0179406 | A1 * | 7/2011 | Ohama | 717/168 |
| 2012/0198434 | A1 * | 8/2012 | Dirstine et al. | 717/170 |

FOREIGN PATENT DOCUMENTS

| | | | | |
|---|---|---|---|---|
| JP | 2006-202086 | A | | 8/2006 |
| JP | 2007-52519 | A | | 3/2007 |
| JP | 2007-213434 | A | | 8/2007 |
| JP | 2004-355304 | | * | 1/2013 |

OTHER PUBLICATIONS

IBM, "Method and System to Provide Firmware Updates of Computer System FRU's from a Bootable OS image and OOB Deliverable Cached Firmware Update image(s) from a Service Processor", 2008, pp. 1-2.*

Gracioli et al., "An Operating System Infrastructure for Remote Code Update in Deeply Embedded Systems", 2008, pp. 1-5.* xdelta: http://xdelta.org/, Release 3.0.0, Jan. 8, 2011.

Yum: Yellow dog Updater, Modified: http://linux.duke.edu/projects/yum/, Jan. 20, 2011.

European Search Report European Application No. 10761536 issued Feb. 6, 2013.

* cited by examiner

| Image size |
|---|
| 8 Mb |

| | 420 | 430 |
|---|---|---|
| | Image number | Directory name |
| 441 | 1 | / |
| 442 | 2 | /lib |
| 443 | 3 | /bin |
| 444 | 4 | /usr |

Fig. 5

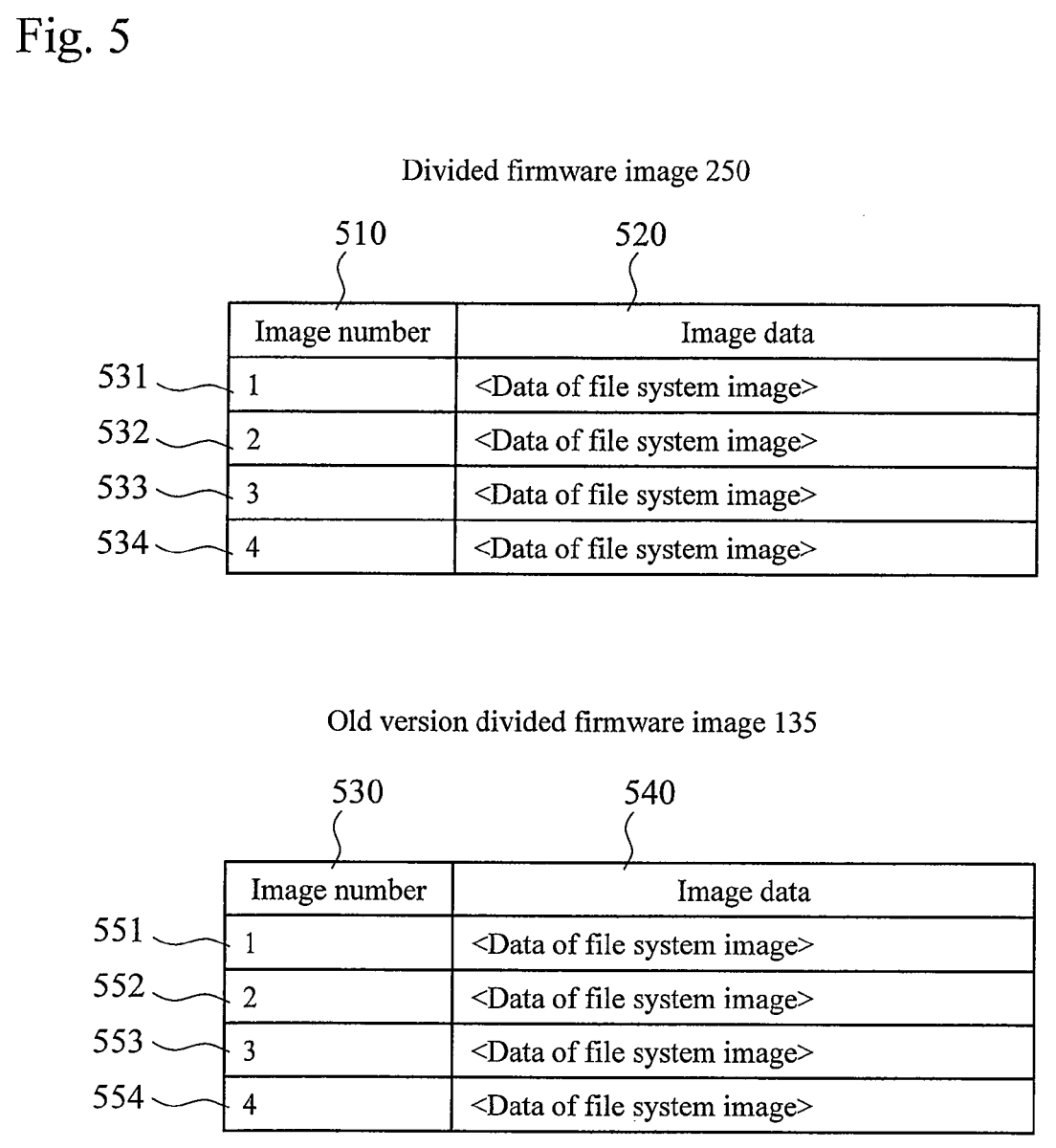

Divided firmware image 250

| | 510 | 520 |
|---|---|---|
| | Image number | Image data |
| 531 | 1 | <Data of file system image> |
| 532 | 2 | <Data of file system image> |
| 533 | 3 | <Data of file system image> |
| 534 | 4 | <Data of file system image> |

Old version divided firmware image 135

| | 530 | 540 |
|---|---|---|
| | Image number | Image data |
| 551 | 1 | <Data of file system image> |
| 552 | 2 | <Data of file system image> |
| 553 | 3 | <Data of file system image> |
| 554 | 4 | <Data of file system image> |

Fig. 6

| | Image number (610) | Updated data (620) |
|---|---|---|
| 631 | 1 | Updated data of image corresponding to image number 1 |
| 632 | 3 | Updated data of image corresponding to image number 2 |

Fig. 7

| | Partition number (710) | Address range (720) |
|---|---|---|
| 731 | 1 | 0x00000001 – 0x00800000 (Size 8M) |
| 732 | 2 | 0x00800001 – 0x00F00000 (Size 8M) |
| 733 | 3 | 0x00F00001 – 0x01000000 (Size 8M) |
| 734 | 4 | 0x01000001 – 0x01800000 (Size 8M) |
| 735 | 5 | 0x01800001 – 0x01F00000 (Size 8M) |
| 736 | 6 | 0x1F000001 – 0x01F40000 (Size 2M) |

Fig. 8

| | Partition number (810) | Image number (820) | Mount point (830) |
|---|---|---|---|
| 831 | 1 | 1 | / |
| 832 | 2 | 2 | /lib |
| 833 | 3 | 3 | /bin |
| 834 | 4 | 4 | /usr |
| 835 | 5 | WORK1 | None |
| 836 | 6 | WORK2 | None |

Fig. 9

| | Update status (910) |
|---|---|
| 921 | 2 |

FIRMWARE UPDATING SYSTEM, FIRMWARE DELIVERING SERVER, FIRMWARE EMBEDDED DEVICE, AND PROGRAM

TECHNICAL FIELD

The present invention relates to a firmware updating technique executed between a firmware delivering server and a firmware embedded device.

BACKGROUND ART

In recent years, after an embedded device such as a DVD device and a TV device is released, when a deficiency is found in software (including firmware), a method of rewriting firmware in the past to firmware in which the deficiency is solved to solve the problem is generally adopted. The firmware indicates all data stored in advance in a nonvolatile storage area of the embedded device. Such firmware update is disclosed in, for example, Patent Literature 1, Non Patent Literature 1, Non Patent Literature 2, and the like.

Patent Literature 1 discloses a firmware updating system for replacing entire firmware. When the firmware is updated through a network in order to replace the entire firmware, since it is necessary to deliver all firmware images of a new version, a data size which should be delivered is large.

Non Patent Literature 1 discloses a technique for extracting a difference between data of an old version and data of a new version. When firmware is updated through a network, if only an update difference of the firmware is delivered using this technique, a delivered data size can be reduced.

Non Patent Literature 2 discloses a software updating program often used in Linux. With the program, software is managed in packet unit and an updated software package is distributed.

CITATION LIST

Patent Literature

Patent Literature 1: JP Patent Publication (Kokai) No. 11-110218 A (1999)

Non Patent Literature

Non Patent Literature 1: xdelta: http://xdelta.org/
Non Patent Literature 2: Yum: Yellow dog Updater, Modified: http://linux.duke.edu/projects/yum/

SUMMARY OF INVENTION

Technical Problem

However, in the method of Patent Literature 1, since a data size which should be delivered is large, there is a problem in that download takes time and an area for download on a device side is large. There is also a problem in that work time for rewriting entire firmware is also long.

In the firmware delivery by Non Patent Literature 1, although the size of data to be delivered is small, there is a problem in that time and a work area are consumed in order to apply update to a firmware image. In other words, for example, when updated data is applied to an old version firmware image, if it is attempted to sequentially apply the updated data to the images of the old version, the firmware image is damaged when the application is interrupted by power-down or the like. Therefore, it is necessary to output the firmware image after the application of the updated data to an area separate from the images of the old version. This requires an extra work area. Since access to the entire images of the old version is necessary, time is also required.

Further, if the update of the firmware of Non Patent Literature 2 is used, although a work area and time are not required, the update cannot be applied to a file system which does not support writing. A file of an update target in a file system is stored in a package. In order to write this file, writing support for the file system is necessary. Usually, in the case of an embedded device, in order to reduce processing (to prevent the processing from affecting startup time), a file system which supports only an I/O request for reading is used. Therefore, a method which can update firmware such as an OS while keeping advantages of the file system which supports only reading is desirable.

The present invention has been devised in view of such a situation and provides a technique in which a work area is small, a work time may be short, update can be resumed even if power-down occurs, and even a file system which does not support writing can update firmware.

Solution to Problem

In order to solve the problems, in the present invention, a firmware delivering server has plural old version divided firmware images generated by dividing an old version firmware image into a predetermined number of firmware images, divides a new version firmware image under a condition same as a condition for the old version firmware image, and generates plural new version divided firmware images. The firmware delivering server extracts, for each division unit of the firmware images, difference information between the new version firmware image and the old version firmware image and generates an updated image having the difference information for the each division unit. The firmware delivering server delivers the updated image to an embedded device. The embedded device which receives the updated image applies the updated image to an existing firmware image in use and updates the firmware.

The plural old version divided firmware images are generated by dividing the old version firmware collectively in files having a common directory name. Therefore, the plural new version divided firmware images are generated by dividing the new version firmware on the basis of the directory name under a condition same as a condition under which the plural old version divided firmware images are generated.

The firmware delivering server further includes an image division table which is used in dividing a firmware image and manages directory names serving as references for allocating the firmware image in association with divided image numbers. In the image division table, area sizes of tables corresponding to the divided image numbers are set equal. In this case, when division processing for the firmware is executed, if a total size of files allocated to a first table area in the division table is larger than the area size, a part of the files allocated to the first table area is moved to a second table area in which a total size of allocated files is smaller than the area size. Link information indicating a moving destination is given to the first table area after movement processing.

The embedded device switches, in applying the updated image to the existing firmware image to update the firmware, a starting OS from a normal OS usually in use to an emergency OS used during an emergency. This emergency OS has a function for specifying, when a power supply for the embedded device is turned off during the firmware update, the updated image to which update is being applied, a function for enabling direct access to a memory, and a function for causing update application processing to operate.

The embedded device has the existing firmware image as an existing divided firmware image generated by dividing the existing firmware image on the basis of the directory name. A condition for this division is the same as the condition used in the division processing for the new and old firmware images. In firmware update processing, the updated image having the difference information for the each division unit based on the directory name is applied to the existing divided firmware image having a directory name corresponding to the directory name.

Further characteristics of the present invention will be made apparent below by best modes for carrying out the present invention and the accompanying drawings.

Advantageous Effects of Invention

According to the present invention, in the embedded device, a work area required for firmware update is small, a work time may be short, update can be resumed even if power-down occurs, and even a file system which does not support writing can update firmware.

BRIEF DESCRIPTION OF DRAWINGS

FIG. 4 is a diagram showing a structure example of an image division table.

FIG. 5 is a diagram showing structure examples of divided firmware images.

FIG. 6 is a diagram showing a structure example of an updated image.

FIG. 7 is a diagram showing a structure example of a partition table.

FIG. 8 is a diagram showing a structure example of a mount table.

FIG. 9 is a diagram showing a structure example of an update status.

DESCRIPTION OF EMBODIMENTS

Figure 1:
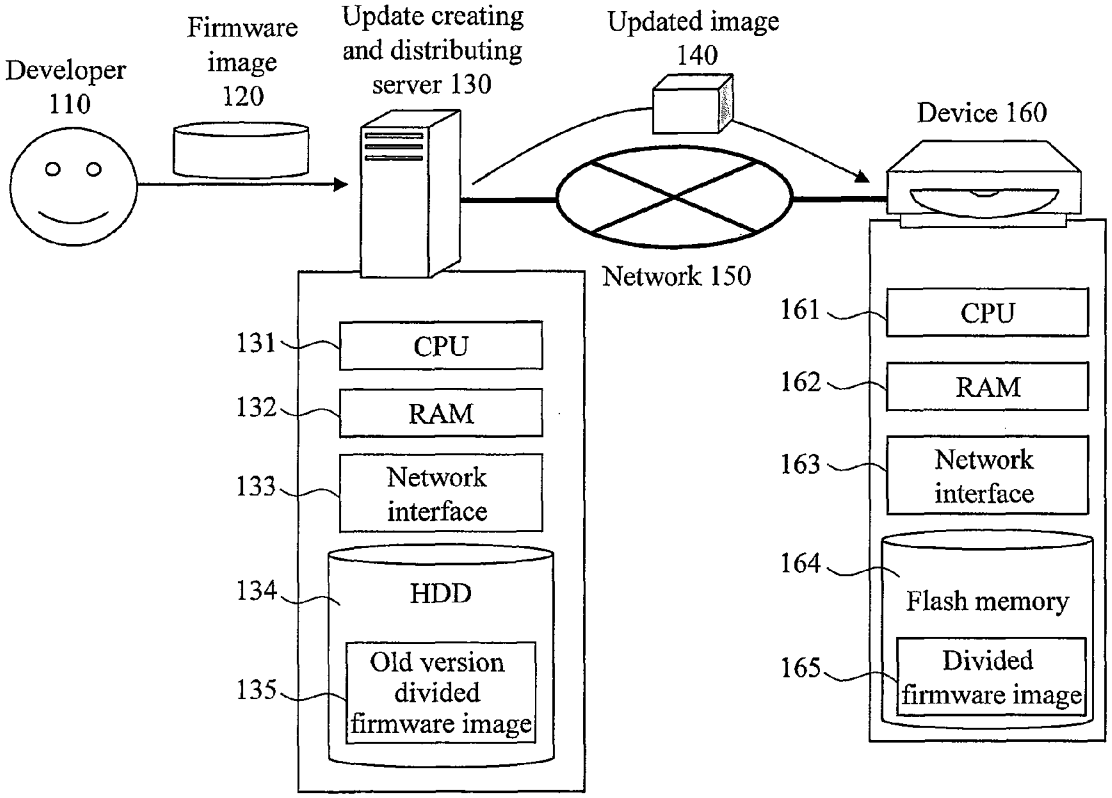
FIG. 1 is a diagram showing a schematic configuration of a firmware updating system according to an embodiment of the present invention.

In the present invention, when explained in a straightforward manner, new and old firmware images are divided, difference data for each divided area is transmitted from a server to an embedded device as an updated image, and the embedded device executes update of firmware with an OS without using a file system.

An embodiment of the present invention is explained below with reference to the accompanying drawings. It should be noted that this embodiment is only an example for realizing the present invention and does not limit a technical scope of the present invention. Components common in figures are denoted by the same reference numerals.

<System Configuration>

FIG. 1 is a diagram showing a schematic configuration of a system (a firmware updating system). The system includes an update creating and distributing server 130 which delivers an updated image 140 and an embedded device 160 which receives the updated image 140 via a network 150 and updates firmware on the inside of the embedded device 160.

A developer 110 transfers a created new firmware image 120 to the update creating and distributing server 130. The firmware image 120 is a firmware image obtained by archiving, as one file, software developed by the developer 110 and a configuration file. A format of the archive is a file system image which does not support a write I/O request. For example, in Linux, the format is an image of a file system such as cramfs.

The update creating and distributing server 130 is a server of an embedded device manufacturer arranged on, for example, the Internet and includes hardware serving as a computer having a network function. Specifically, the update creating and distributing server 130 includes a CPU 131, a RAM 132, a network interface 133, and an HDD 134. In the HDD 134, a divided firmware image obtained by dividing a firmware image is stored. Specifically, the divided firmware image is an old version divided firmware image 135 created on the basis of an old version firmware image immediately preceding the new firmware image 120. A software configuration of the update creating and distributing server 130 is explained later with reference to FIG. 2. The structure of the old version divided firmware image 135 is explained later with reference to FIG. 5.

The update creating and distributing server 130 creates the updated image 140 on the basis of the firmware image 120 and the old version divided firmware image 135 and transmits the updated image 140 to the embedded device 160 via the network 150. A detailed structure of the updated image 140 is explained later with reference to FIG. 6.

The embedded device 160 includes hardware serving as a computer having a network function. Specifically, the embedded device 160 includes a CPU 161, a RAM 162, a network interface 163, and a flash memory 164. The device 160 transmits a software update request to the update creating and distributing server 130, receives the updated image 140, and updates a divided firmware image 165 stored in the flash memory 164. A software configuration of the embedded device 160 is explained later with reference to FIG. 3. The structure of the divided firmware image 165 currently used in the embedded device 160 is explained later with reference to FIG. 5.

<Software Configuration of the Update Creating and Distributing Server>

Figure 2:
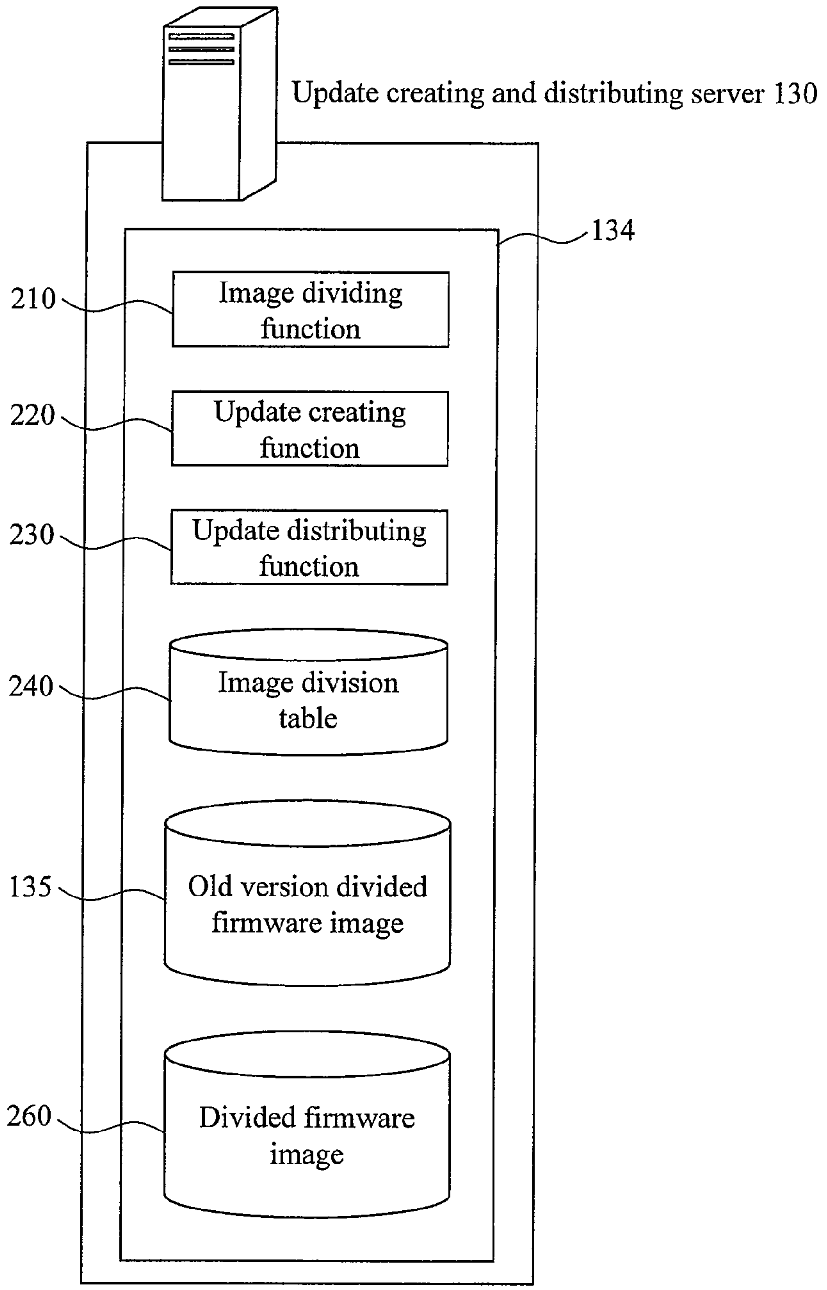
FIG. 2 is a diagram showing a software configuration of an update creating and distributing server according to the embodiment of the present invention.

FIG. 2 is a diagram showing the configuration of software of the update creating and distributing server 130. The software includes an image dividing function 210, an update creating function 220, an update distributing function 230, an image division table 240, the old version divided firmware image (storing unit) 135, and a new divided firmware image (storing unit) 260. The functions and data are stored in the HDD 134.

Figure 10:
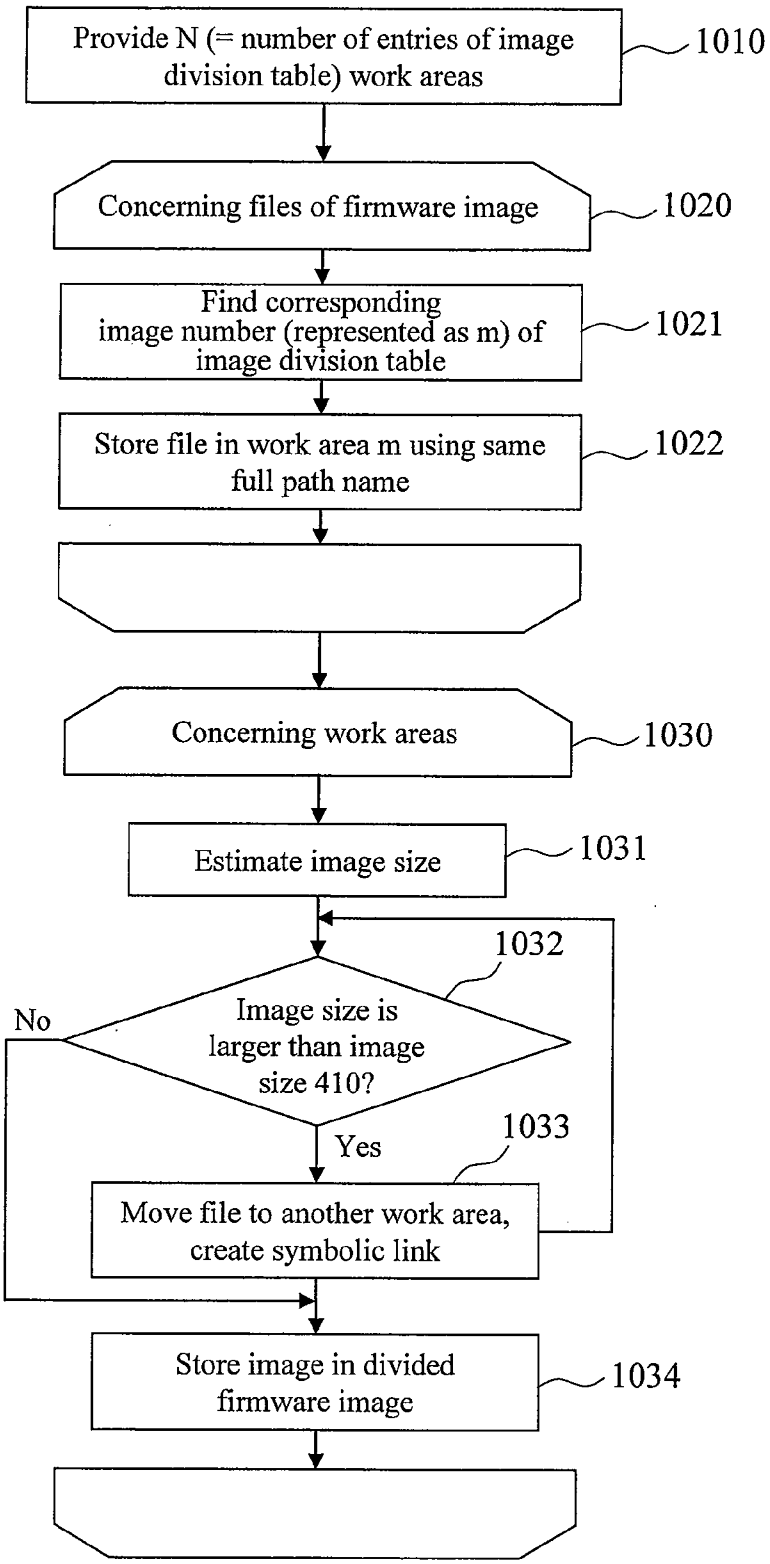
FIG. 10 is a flowchart for explaining processing contents of an image dividing function.
Figure 11:
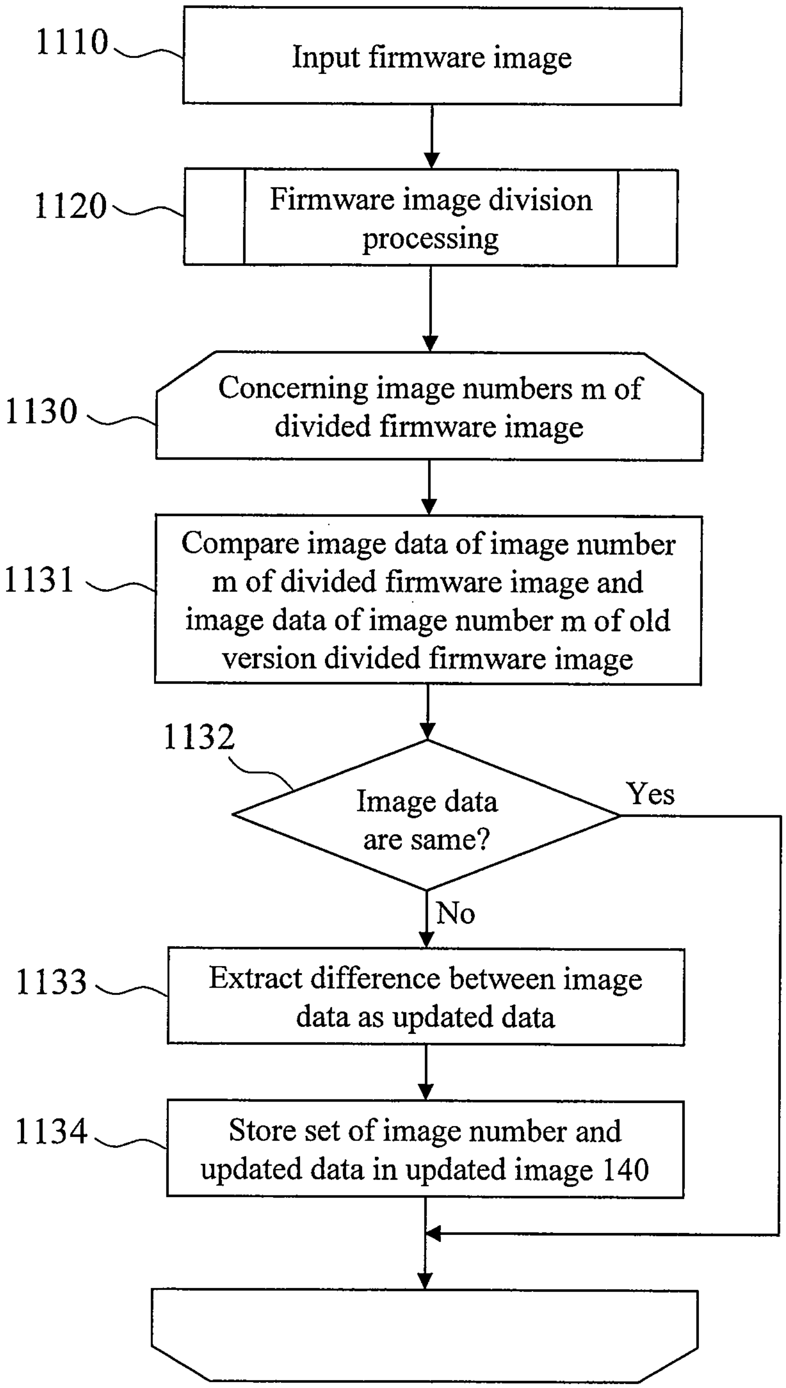
FIG. 11 is a flowchart for explaining processing contents of an update creating function.

The image dividing function 210 is a function invoked and used by the update creating function 220 (see FIG. 11). The image dividing function 210 divides the firmware image 120 and creates the new version firmware image 260. Details of processing contents of the image dividing function are explained later with reference to FIG. 10.

The update creating function 220 is a function for creating the updated image 140. Detailed processing contents are explained later with reference to FIG. 11.

The update distributing function 230 is a function for distributing the updated image 140 to the embedded device 160. Detailed processing of the update distributing function 230 is explained later with reference to FIG. 12.

The image division table 240 is data used in the image dividing function 210. Details are explained later with reference to FIG. 4. The divided firmware image 260 is an output of the image dividing function 210. A detailed structure is explained later with reference to FIG. 5.

<Software Configuration of the Embedded Device>

Figure 3:
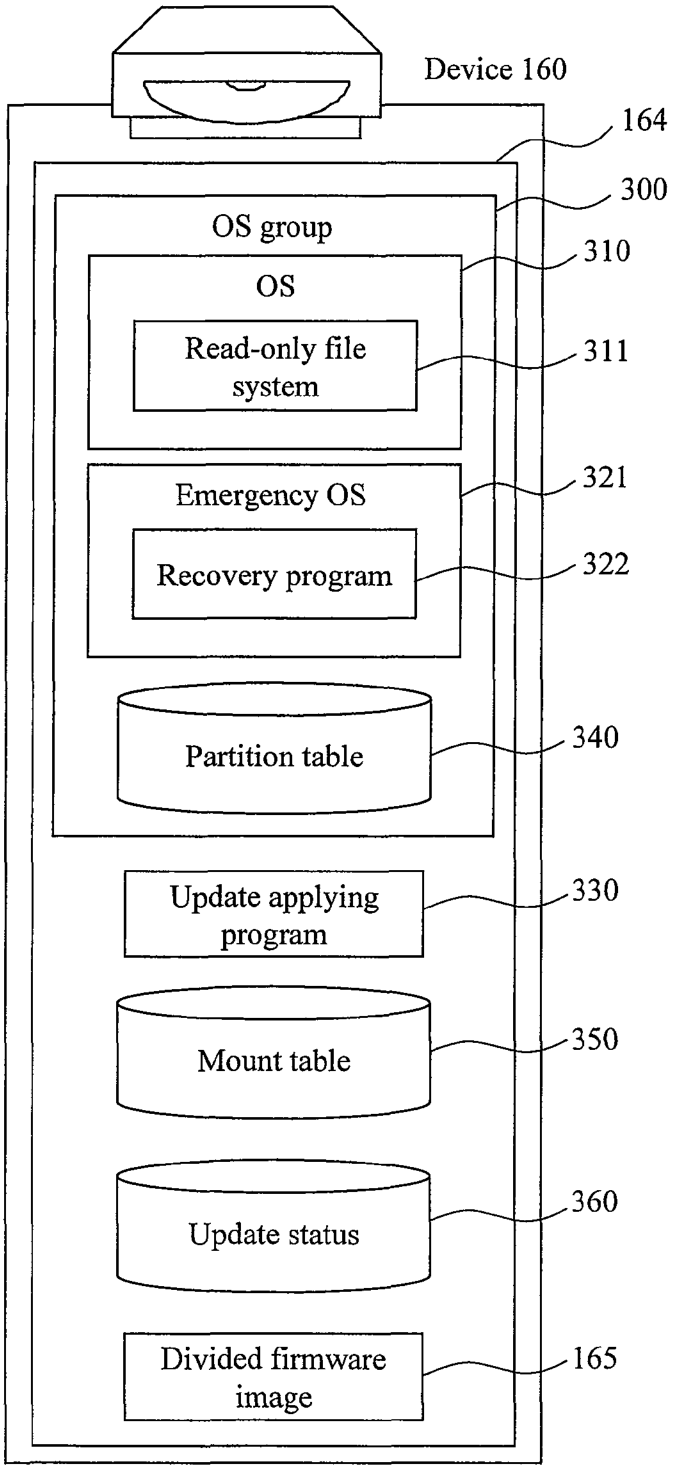
FIG. 3 is a diagram showing the configuration of software of an embedded device according to the present invention.

FIG. 3 is a diagram showing a software configuration of the embedded device 160. The software includes an OS group 300, an update applying program 330, a mount table 350, an update status 360, and the divided firmware image 165. The OS group 300 includes a normal OS 310 used in normal time and having a read-only file system, an emergency OS 321 used during an emergency such as during disconnection of a power supply and having a recovery program 322, and a partition table 340. The divided firmware image 165 is a divided firmware image mounted on the embedded device 160 at the present point. Before update, the divided firmware image 165 has contents same as the contents of the old version divided firmware image 135. After the update, the divided firmware image 165 has contents same as the contents of the new version divided firmware image 260.

The normal OS (operating system) 310 supports a read-only file system 311 as a file system. The read-only file system 311 is mounted with a file system image on the flash memory 164 and makes it possible to access a file in a directory tree such as Linux. However, even if a file is opened through the directory tree, only reading operation for the file is supported and writing operation for the file is not supported. In order to perform writing in the flash memory, it is necessary to directly access the flash memory in the same manner as an MTD interface of the Linux OX.

The emergency OS 321 is an OS used when processing of the update applying program 330 is interrupted by power-down or the like. The emergency OS 321 includes the recovery program 322. Processing of the recovery program 322 is explained with reference to FIG. 14. Briefly explained, the recovery program 322 has a function for writing updated firmware in the flash memory 164. However, in this case, unlike a file system in which writing can be performed designating only a file name and which supports writing, writing has to be performed designating an address (LBA) of a flash memory in which writing should be performed.

The partition table 340 is a table which describes partitioning in the flash memory 164 and is stored in the OS group 300 including the normal OS 310 and the emergency OS 321. A detailed structure of the partition table 340 is explained later with reference to FIG. 7.

The update applying program 330 is a program for updating the divided firmware image 165 on the basis of the updated image 140. Detailed processing contents of the update applying program 330 are explained later with reference to FIG. 13.

The mount table 350 describes in what kind of a file tree the divided firmware image 165 in the embedded device 160 is mounted. The mount table 350 is recorded in an area separate from the divided firmware image 165 in the flash memory 164. A detailed structure of the mount table 350 is explained later with reference to FIG. 8.

The update status 360 is an area for storing an updated state and is recorded in an area separate from the divided firmware image 165 in the flash memory 164. A detailed structure of the update status 360 is explained later with reference to FIG. 9.

<Structure of the Image Division Table>

FIG. 4 is a diagram showing the structure of the image division table 240. This image division table 240 is used for dividing the firmware image 120 created anew and generating the new version divided firmware image 260.

In FIG. 4, an image size 410 is a size of division. In an example shown in FIG. 4, the division size (a size of each divided image) is set to not exceed 8 Mbyte. However, the division size is not limited to this size.

In the image division table 240, an image number 420 is given to a divided image. In a directory name 430, a sub-tree of a directory stored in the divided image is described. For example, a row denoted by a reference number 422 has a meaning "a directory tree of /lib and lower directories is stored in an image of an image number 2". "/" in a row of a reference number 441 has a meaning "all directory trees not stored in rows of reference numbers 442, 443, and 444 are stored".

<Structures of the Divided Firmware Images (New and Old)>

FIG. 5 is a diagram showing the structures of the divided firmware image 260 and the old version divided firmware image 135. The divided firmware images 260 and the 135 are generated by dividing the firmware image 120 in unit of the image size (the division size) 410 and include image numbers 510 and 530 and divided image data 520 and 540.

<Structure of the Updated Image>

FIG. 6 is a diagram showing the structure of the updated image 140. The updated image 140 includes an image number 610 and updated data 620 corresponding to the image number. As shown in FIG. 6, for example, since the image data of the image number 2 is the same in new and old data, the image data is not included in the updated image 140.

<Structure of the Partition Table>

FIG. 7 is a diagram showing the structure of the partition table 340. This partition table 340 is a table referred to when it is determined where image data is physically written. In the partition table 340, partitioning of the flash memory 164 is set.

The partition table 340 includes a partition number 710 and an address range 720 corresponding to the partition number 710. In this example, five 8 M-byte partitions and one 2 M-byte partition are defined.

<Structure of the Mount Table>

FIG. 8 is a diagram showing a detailed structure of the mount table 350. The mount table 350 is used for storing correct data in correct positions in a file tree and includes a partition number 810 in which an image is stored, an image number 820, and a mount point 830 where data is mounted by the OS. If the mount point 830 is unknown, the OS cannot determine as what data an image should be mounted.

In the mount table 350, for example, a row 832 means "an image corresponding to the image number 2 is stored in a partition of a partition number 2 and the OS mounts this image in /lib".

<Structure of the Update Status>

FIG. 9 is a diagram showing the structure of the update status 360. In the update status 360, an update status number is stored. Specifically, the update status 360 is information indicating an updated image corresponding to which image number is currently updated. When update processing for all updated images ends, since an image number of an updated image updated last is recorded, it is seen that all the updated image are processed.

<Processing Contents of the Image Dividing Function>

FIG. 10 is a flowchart for explaining processing contents executed by the image dividing function used in the update creating function 220. The processing contents are explained using the table example shown in FIG. 4 as the image division table 240.

First, the image dividing function 210 provides, on the RAM 132, work areas having the number of rows same as the number of rows of the image division table 240 (step 1010). In the image division table 240 shown in FIG. 4, four work areas are provided.

Subsequently, the image dividing function 210 repeatedly executes processing in the following steps 1021 and 1022 concerning files included in the firmware image 120 (step 1020).

Specifically, the image dividing function 210 finds to which image number 420 of the image division table 240 a file corresponds (step 1021). For example, if a file name is /lib/libc.so, an image number is "2". If the file name is /sbin/insmod, since the file name does not correspond to all directories of rows 442, 443, and 444, the file name is regarded as matching a directory "/" in a row 441 and an image number is "1".

The image dividing function 210 stores the file in a work area corresponding to an image number which matches the file in step 1021 (step 1022). For example, if the file name is /lib/libc.so, the image dividing function 210 stores the file in a work area 2 using the same file name. If the file name is /sbin/insmod, the image dividing function 210 stores the file in a work area 1 using the same file name.

Subsequently, the image dividing function 210 repeatedly executes processing in the following steps 1031 to 1034 concerning the work areas (step 1030). The image dividing function 210 estimates a size of a file obtained by archiving files stored in the work areas as file system images (step 1031). Specifically, the image dividing function 210 actually creates an archive and measures a file size of the created archive.

The image dividing function 210 determines whether an image size is larger than the image size 410 (in the example shown in FIG. 4, 8 M bytes) (step 1032). When it is determined that the image size is larger than the image size 410, the processing shifts to step 1033. When it is determined that the image size is smaller than the image size 410, the processing shifts to step 1034.

In the case of Yes in step 1032, the image dividing function 210 moves the file stored in the work area to a work area having an image size smaller than the image size 410, leaves the original file as a symbolic link, and sets a moving destination as a link destination (step 1033). For example, when /lib/libc.so stored in the work area 2 is moved to a work area 3 as /bin/overflow3/lib/libc.so, /lib/libc.so in the work area 2 is left as a symbolic link to /bin/overflow3/lib/libc.so. In this way, even if contents of the file are moved, it is possible to access the file using the same name.

In the case of No in step 1032 or after the processing in step 1033, the image dividing function 210 archives the file stored in the work area as a file system image and stores the file system image in the divided firmware image 260 (step 1034). For example, a storage location of the file stored in the work area 2 is a row 532.

According to the work explained above, the firmware image 120 is divided into a file system image of maximum 8 M bytes and stored as the divided firmware image 260.

<Processing Contents of the Update Creating Function>

FIG. 11 is a flowchart for explaining contents of updated image creation processing executed by the update creating function 220.

First, the firmware image 120 created by the developer 110 is input to the update creating and distributing server 130 and the update creating function 220 acquires the firmware image 120 (step 1110).

Subsequently, the update creating function 220 invokes the image dividing function 210, performs firmware image division processing (FIG. 10) using the image dividing function 210, and acquires the divided firmware image 260 (step 1120).

The update creating function 220 repeatedly executes the following steps 1113 to 1134 concerning the image numbers 510 (a loop variable m) of the divided firmware image 260 (step 1130).

Specifically, the update creating function 220 compares the image data 520 of the divided firmware image 260 in which an image number 510 is m and the image data 540 of the old version divided firmware image 135 in which an image number 530 is m (step 1131) and determines whether the image data are the same (step 1132). When the image data are the same, the processing ends. When the image data are not the same, the processing shifts to step 133.

In the case of No in step 1132, the update creating function 220 extracts, in binary unit, difference data between the image data 520 of the divided firmware image 260 and the image data 530 of the old version firmware image 135 in step 1131 (step 1133). As an extracting method, for example, a technique such as xdelta can be used.

Subsequently, the update creating function 220 stores m in the image number 610 of the updated image 140 and stores the difference data extracted in step 1133 in the updated data 620 (step 1134).

As explained above, an updated image is created. As explained above, the updated image has, for example, the structure shown in FIG. 6.

<Processing Contents of the Update Distributing Function>

Figure 12:
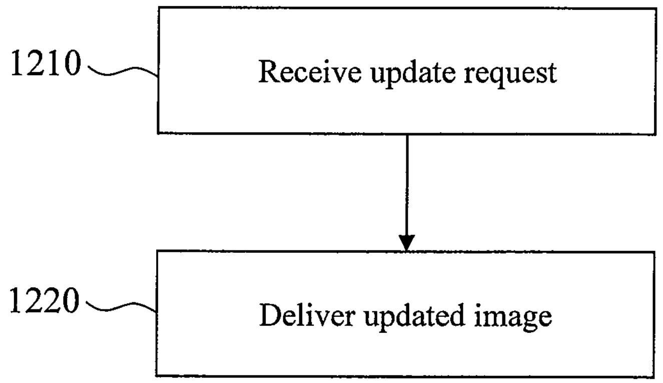
FIG. 12 is a flowchart for explaining processing contents of an update distributing function.

FIG. 12 is a flowchart for explaining processing contents of the update distributing function 230.

When the update distributing function 230 acquires a request for firmware update transmitted from the embedded device 160 to the update creating and distributing server 130 (step 1210), the update distributing function 230 delivers an updated image created by the update creating function 220 to the embedded device 160 in a request transmission source (step 1220).

As the transmission of the update request, for example, a user only has to designate update, the embedded device 16 only has to periodically automatically transmit the update request, or, when the embedded device 160 is started, the embedded device 160 only has to communicate with the update creating and distributing server 130 to check whether firmware is updated and, when the firmware is updated, automatically transmit the update request.

<Processing Contents of the Update Applying Program>

Figure 13:
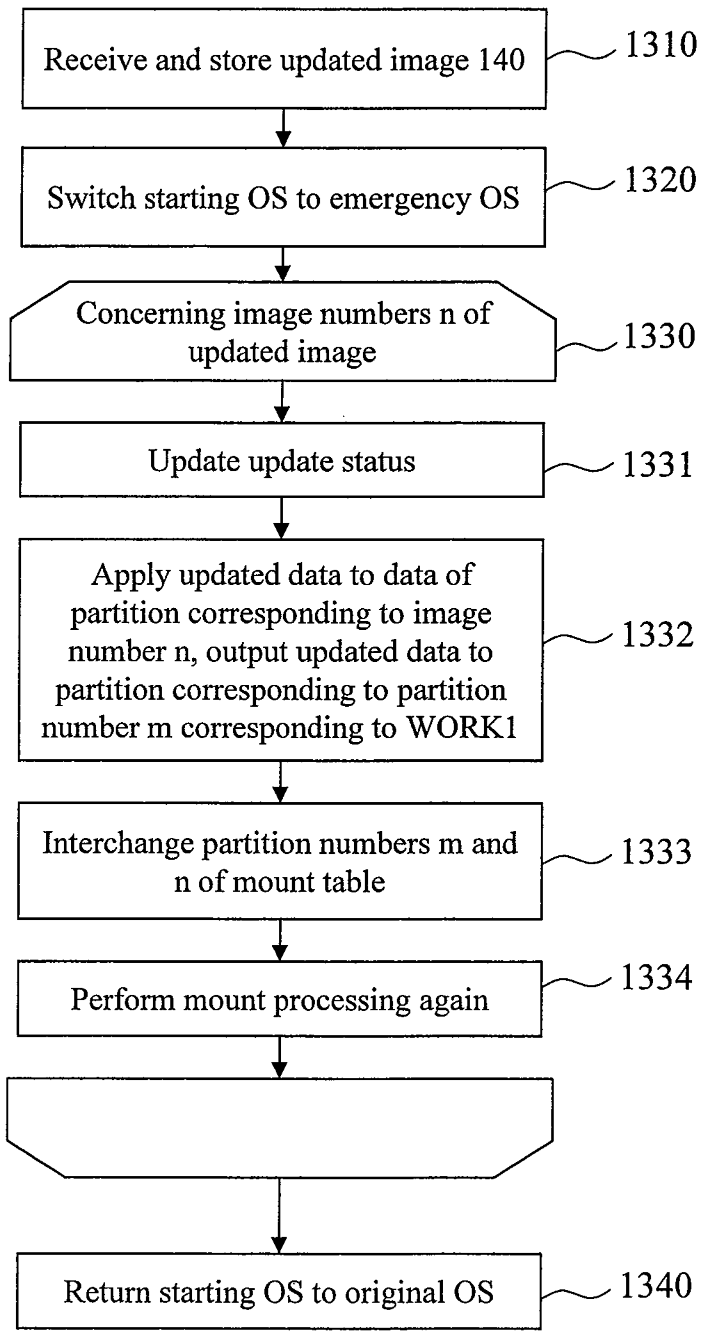
FIG. 13 is a flowchart for explaining processing contents of an update applying program.

FIG. 13 is a flowchart for explaining processing contents executed by the update applying program 330 in the embedded device 160. The update applying program 330 functions as an update application processing unit in cooperation with the CPU 161.

The embedded device 160 receives the updated image 140 from the update creating and distributing server 130, the started update applying program 330 notifies the normal OS (expanded on the RAM) of a storage location, and the normal OS stores the updated image 140 in a memory (step 1310). A storage destination of the updated image 140 is a partition corresponding to the partition number 810 in a row of the mount table 350 in which the image number 820 is "WORK2". In the case of the mount table illustrated in FIG. 8, the storage destination is a partition (WORK2) corresponding to a partition number 6. When the updated image 140 is stored, a function other than the file system 311 of the normal OS directly writes the updated image 140 in the flash memory 164 without the intervention of the file system 311. An update status 921 is set to "0" (which indicates that no file is updated yet).

Subsequently, the update applying program 330 switches an OS at the next start time from the normal OS 310 to the emergency OS 321 (step 1320). This is processing for making it possible to use the emergency OS 321 when the power supply is turned off, for example, in an emergency. Unless the power supply is turned off, the normal OS 310 (the normal OS expanded on the RAM 162) is used. The switching can be realized by, for example, switching setting of a boot loader. The emergency OS 321 only has to have, as functions, for example, at least an update status referring function, a function for designating an address and executing read and write of data from and in the flash memory 164, and a function for executing the recovery program 322.

The update applying program 330 repeatedly executes processing in steps 1331 to 1334 concerning the image numbers 610 of the updated image 140 (step 1330). A variable for the repetition is represented as n below.

The update applying program 330 updates the update status 921 (step 1331). Specifically, "n" is input to the update status 921.

The update applying program 330 finds a partition corresponding to an image number n referring to the mount table 350 (FIG. 8) and sets the partition as an application target of the updated data 620. For example, in the case of n=1, referring to FIG. 8, a partition number corresponding to the image number 1 is 1. Data present in this partition is set as an update application target. The updated data 620 is applied to the update application target data. In the application, a function such as a difference applying function of xdelta is used. The data after the application is output to a partition (a partition number is "m") in which an image number corresponds to WORK (work area) 1. In the example shown in FIG. 8, since the partition number corresponding to WORK1 is 5, the data is output to a partition 5. In this way, the updated data is stored in WORK1 rather than the area of the partition number 1. This is because, unless old version data is not left, the update processing for the firmware cannot be resumed when the power supply is turned off halfway.

When the storage of the updated data in the application target is completed, the update applying program 330 interchanges m and n of the partition number 810 of the mount table (step 1333). In the example shown in FIG. 8, a partition number of a row 831 is 5 and a partition number of a row 835 is 1.

Subsequently, the update applying program 330 performs mount processing again. In the case of the example explained above, the mount point "/" is mounted in the partition 5. Consequently, data mounted in the mount point "/" is updated data of the image number 1.

After transmitted all updated images are applied (after the processing in steps 1332 to 1334 ends concerning all image numbers), the update applying program 330 returns the starting OS to the original normal OS 310 and the processing ends (step 1340).

<Processing Contents of the Recovery Program>

Figure 14:
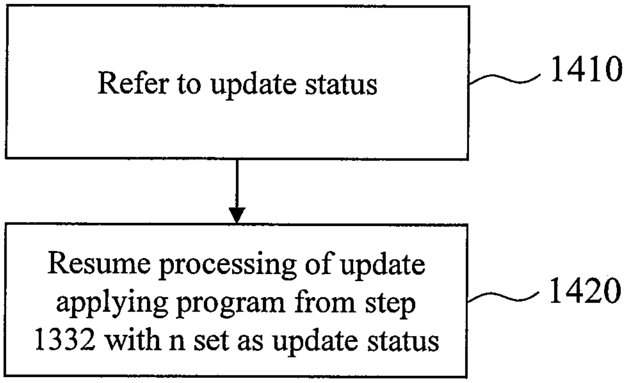
FIG. 14 is a flowchart for explaining processing contents of a recovery program.

FIG. 14 is a flowchart for explaining processing of the recovery program 322 started from the emergency OS 321. The emergency OS 321 is started when the processing shown in FIG. 13 ends halfway.

When the processing shown in FIG. 13 ends due to some reason (an emergency or an abnormality), the recovery program 322 acquires, referring to the update status 921, an image number of updated data being updated (being processed when the processing ends) (step 1410). In the case of FIG. 9, the image number is 2.

The recovery program 322 resumes the processing shown in FIG. 13 from step 1332 of the processing shown in FIG. 13 with n set to (the value of step 1410) (step 1420). At this point, the emergency OS 321 is used.

CONCLUSION

In this embodiment, the update creating and distributing server divides each of an old version firmware image and a new version firmware image of the update target device (the embedded device) into N new version firmware images i $(1<i<N)$ (hereinafter, new firmware images i) and N old version firmware images i (hereinafter, old firmware images) having an equal size M (bytes). The update creating and distributing server extracts differences i $(1<i<N)$ between the old firmware images i and the new firmware images i, collects the differences i as an updated package, and delivers the updated package to the target device. Consequently, update processing on the embedded device side is only update for the divided firmware images i having the differences. Therefore, it is easy to specify an update target file and it is possible to extremely efficiently execute update processing for firmware.

The flash memory of the update target device is divided into N or more partitions. A partition size is at least equal to or larger than the size M. The old firmware images i are stored in the respective partitions. The update target device receives the updated package, applies the differences i included in the package to the old firmware images i stored in the partitions, and generates the new firmware images i.

Further, a partition W for work used for update work for the old firmware images i is provided in the target device. The target device outputs the new firmware images i, which are an output of the update work for the old firmware images i, to the partition W. After the update, the target device treats data of W as the new firmware images i and treats a partition, in which the old firmware images i are stored, as W.

An emergency OS and update status data are provided in the target device. The target device stores, in the update status, a state concerning which firmware image i is currently updated. When the power supply is interrupted halfway in update, the emergency OS is started when the power supply is turned on next time. The target device resumes the update processing referring to the update status data.

Consequently, the size of the work area is only the partition W for work. Time required for update is only time for updating the divided firmware images i having the differences. Therefore, the time is shorter than time for updating all the firmware images. Further, even when the power supply is interrupted halfway in the work for generating the new firmware images i from the old firmware images i, since the old firmware images i are left, it is possible to resume the update when the power supply is turned on next time.

In the embodiment, the size of the work area is 10 M bytes as a total of the partitions WORK1 and WORK2 for work. The size of the firmware image is 32 M bytes because the size of the firmware image is equivalent to the size of four 8 M images. In a system for updating all firmware images, since a work area for having a size (32 M bytes) same as the size of the firmware images is necessary, the work area can be reduced. Time required for the update is only time for updating the divided firmware images having the differences. Therefore, the time is shorter than time for updating all the firmware images. Further, even when the power supply is interrupted halfway in the work for generating the new firmware images from the old firmware images, according to the processing shown in FIG. 14, it is possible to resume the update when the power supply is turned on next time.

The present invention can also be realized by a program code of software for realizing the function of the embodiment. In this case, a storage medium having the program code recorded thereon is provided to the system or the device. A computer of the system or the device reads out the program code stored in the storage medium. In this case, the program code itself read out from the storage medium realizes the functions of the embodiment explained above. The program code itself and the storage medium having the program code stored therein configure the present invention. As the storage medium for supplying such a program code, for example, a flexible disk, a CD-ROM, a DVD-ROM, a hard disk, an optical disk, a magneto-optical disk, a CD-R, a magnetic tape, a nonvolatile memory card, a ROM, or the like is used.

It is also possible that an OS (operating system) running on the computer performs a part or all of actual processing on the basis of an instruction of the program code and the functions of the embodiment is realized by the processing. Further, it is also possible that, after the program code read out from the storage medium is written in a memory on the computer, a CPU or the like of the computer performs a part or all of the actual processing on the basis of an instruction of the program code and the functions of the embodiment is realized by the processing.

It is also possible that the program code of the software for realizing the functions of the embodiment is delivered via a network, whereby the program code is stored in storage means such as a hard disk or a memory of the system or the device or a storage medium such as a CD-RW or a CD-R, and, when in use, the computer (or a CPU or an MPU) of the system or the device reads out and executes the program code stored in the storage means or the storage medium.

The invention claimed is:

1. A firmware updating system comprising:

a processor;

an embedded device in which firmware is incorporated; and a firmware delivering server which is connected to the embedded device via a network and delivers a firmware image including software and configuration data of the software, wherein the firmware delivering server includes:

a storing unit which stores plural old version divided firmware images generated by dividing an old version firmware image into a predetermined number of firmware images;

a divided image creating unit which divides a new version firmware image under a condition same as a condition for the old version firmware image to generate plural new version divided firmware images;

an updated image creating unit which extracts, for each division unit of the firmware images, difference information between the new version firmware image and the old version firmware image and generates an updated image having the difference information for the each division unit; and a delivering unit which delivers the updated image to the embedded device, and the embedded device includes:

a receiving unit which receives the updated image; and an update applying unit which applies the updated image to an existing firmware image in use and updates the firmware, wherein the plural old version divided firmware images are generated by dividing the old version firmware collectively in files having a common directory name, wherein the divided image creating unit divides the new version firmware to generate the plural new version divided firmware images on the basis of the directory name under a condition same as a condition under which the plural new version divided firmware images are generated, wherein the firmware delivering server further includes an image division table which is used in dividing the firmware image and manages directory names serving as references for allocating the firmware image in association with divided image numbers, wherein in the image division table, area sizes of tables corresponding to the divided image numbers are set equal, and wherein the divided image creating unit moves, if a total size of files allocated to a first tables area is larger than the area size, a part of the files allocated to the first table area to a second table area in which a total size of allocated files is smaller than the area size and gives link information indicating a moving destination to the first table area after movement processing to thereby divide the firmware image.

2. A firmware updating system according to claim 1, wherein the update applying unit switches, in applying the updated image to the existing firmware image to update the firmware, a starting operating system ("OS") from a normal OS usually in use to an emergency OS used during an emergency.

3. A firmware updating system according to claim 2, wherein the emergency OS has a function for specifying, when a power supply for the embedded device is turned off during the firmware update, the updated image to which update is being applied, a function for enabling direct access to a memory, and a function for causing the update applying unit to operate.

4. A firmware updating system according to claim 1, wherein the embedded device has the existing firmware image as an existing divided firmware image generated by dividing the existing firmware image on the basis of the directory name, and the update applying unit applies the updated image having the difference information for the each division unit based on the directory name to the existing divided firmware image having a directory name corresponding to the directory name to update the firmware.

5. A firmware delivering server having a processor which is connected to an embedded device, in which firmware is incorporated, via a network and delivers a firmware image including software and configuration data of the software, the firmware delivering server comprising:

a storing unit which stores plural old version divided firmware images generated by dividing an old version firmware image into a predetermined number of firmware images;

a divided image creating unit which divides a new version firmware image under a condition same as a condition for the old version firmware image to generate plural new version divided firmware images;

an updated image creating unit which extracts, for each division unit of the firmware images, difference information between the new version firmware image and the old version firmware image and generates an updated image having the difference information for the each division unit; and a delivering unit which delivers the updated image to the embedded device, wherein the plural old version divided firmware images are generated by dividing the old version firmware collectively in files having a common directory name, wherein the divided image creating unit divides the new version firmware to generate the plural new version divided firmware images on the basis of the directory name under a condition same as a condition under which the plural new version divided firmware images are generated, wherein the firmware delivering server further includes an image division table which is used in dividing the firmware image and manages directory names serving as references for allocating the firmware image in association with divided image numbers, wherein in the image division table, area sizes of tables corresponding to the divided image numbers are set equal, and wherein the divided image creating unit moves, if a total size of files allocated to a first tables area is larger than the area size, a part of the files allocated to the first table area to a second table area in which a total size of allocated files is smaller than the area size and gives link information indicating a moving destination to the first table area after movement processing to thereby divide the firmware image.

6. A non-transitory computer readable storage medium which stores a program for causing a computer to function as the firmware delivery server according to claim 5.

* * * * *